United States Patent
Peng

(10) Patent No.: US 10,567,716 B2
(45) Date of Patent: Feb. 18, 2020

(54) PROJECTION SYSTEM, LIGHT BEAM GENERATING DEVICE THEREOF AND METHOD FOR CONTROLLING LIGHT BEAM LUMINANCE

(71) Applicant: Coretronic Corporation, Hsin-Chu (TW)

(72) Inventor: Chih-Hsun Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/502,016

(22) Filed: Jul. 2, 2019

(65) Prior Publication Data
US 2020/0014894 A1    Jan. 9, 2020

(30) Foreign Application Priority Data
Jul. 5, 2018    (CN) .......................... 2018 1 0728933

(51) Int. Cl.
*H04N 9/31*    (2006.01)
(52) U.S. Cl.
CPC ......... *H04N 9/3155* (2013.01); *H04N 9/3161* (2013.01); *H04N 9/3191* (2013.01)
(58) Field of Classification Search
CPC ... H04N 9/3155; H04N 9/3161; H04N 9/3191
See application file for complete search history.

(56) References Cited

U.S. PATENT DOCUMENTS

| 2006/0192899 A1* | 8/2006 | Ogita | H04N 9/3105 348/744 |
| 2011/0156596 A1* | 6/2011 | Salsbury | H05B 33/0869 315/152 |
| 2012/0326621 A1 | 12/2012 | Davoodabadi et al. | |
| 2019/0014293 A1* | 1/2019 | Ikeura | H04N 9/3105 |

FOREIGN PATENT DOCUMENTS

CN    102520568    6/2012

* cited by examiner

*Primary Examiner* — Michael E Teitelbaum
(74) *Attorney, Agent, or Firm* — JCIPRNET

(57) ABSTRACT

A projection system, a light beam generating device thereof and a method for controlling light beam luminance are provided. The light beam generating device includes a first controller, a driver, an illuminating device, a sensing device and a second controller. The driver generates a driving current according to a control command. The illuminating device generates an output light beam according to the driving current. The sensing device detects the driving current and the output light beam to respectively generate a sensing current signal and a sensing luminance signal. The second controller generates an adjustment signal according to the sensing current signal and the sensing luminance signal. The first controller or the second controller generates the control command according to the adjustment signal, and a computing speed of the second controller is greater than a computing speed of the first controller.

21 Claims, 4 Drawing Sheets

PROJECTION SYSTEM, LIGHT BEAM GENERATING DEVICE THEREOF AND METHOD FOR CONTROLLING LIGHT BEAM LUMINANCE

CROSS-REFERENCE TO RELATED APPLICATION

This application claims the priority benefit of China application serial no. 201810728933.0, filed on Jul. 5, 2018. The entirety of the above-mentioned patent application is hereby incorporated by reference herein and made a part of this specification.

BACKGROUND OF THE INVENTION

Field of the Invention

The invention relates to a projection system, a light beam generating device and a method for controlling light beam luminance. More particularly, the invention relates to a light beam generating device with multi-loop control and a method for controlling light beam luminance.

Description of Related Art

In the technical field of projectors, for effectively controlling luminance of projection light beams, a plurality of sensors are usually disposed in a projector, and the luminance of the projection light beams is regulated by means of feeding back sensed values. However, in the related known art, a micro controlling unit (MCU) is usually applied to perform operations related to the luminance regulation. Based on considerations of cost, a computing speed of the MCU disposed in the projector is limited to a certain degree. Thus, the projector of the related known art may result in inaccurate regulation of the luminance due to an insufficiently quick speed of the MCU, which may influence the display quality of a projection image.

Additionally, in the technical field at present, the projector uses laser diodes as illuminating devices. On the basis that current of the laser diodes have very small tolerance, and variation in the currents corresponding to a control command may cause a risk of failure to the laser diodes. In addition, the laser diodes are sensitive to variation in temperatures. Thus, how to accurately regulate illuminating luminance of the laser diodes has become to an important subject for people skilled in the art.

The information disclosed in this "Description of Related Art" section is only for enhancement of understanding of the Related Art of the described technology and therefore it may contain information that does not form the prior art that is already known to a person of ordinary skill in the art. Further, the information disclosed in this "Description of Related Art" section does not mean that one or more problems to be resolved by one or more embodiments of the invention was acknowledged by a person of ordinary skill in the art.

SUMMARY OF THE INVENTION

The invention provides a light beam generating device and a method for controlling light beam luminance capable of quickly generating an adjustment signal for adjusting a driving current.

The invention provides a projection system having a light beam generating device capable of quickly generating an adjustment signal for adjusting a driving current.

Other features and advantages of the invention can be further understood by the technical features disclosed in the invention.

To achieve one, part, or all of the objectives aforementioned or other objectives, a light beam generating device provided by an embodiment of the invention includes a first controller, a driver, an illuminating device, a sensing device and a second controller. The driver is coupled to the first controller and generates a driving current according to a control command. The illuminating device is coupled to the driver and generates an output light beam according to the driving current. The sensing device is coupled to the driver and the illuminating device and detects the driving current and the output light beam, so as to respectively generate a sensing current signal and a sensing luminance signal. The second controller is coupled to the first controller, the sensing device and the driver and generates the adjustment signal according to the sensing current signal and the sensing luminance signal. The first controller or the second controller generates the control command according to the adjustment signal. A computing speed of the second controller is greater than a computing speed of the first controller.

To achieve one, part, or all of the objectives aforementioned or other objectives, a projection system provided by an embodiment of the invention includes a lens and a light beam generating device. The light beam generating device is coupled to the lens. The light beam generating device includes a first controller, a driver, an illuminating device, a sensing device and a second controller. The driver is coupled to the first controller and generates a driving current according to a control command. The illuminating device is coupled to the driver and generates an output light beam according to the driving current. The sensing device is coupled to the driver and the illuminating device and detects the driving current and the output light beam, so as to respectively generate a sensing current signal and a sensing luminance signal. The second controller is coupled to the first controller, the sensing device and the driver and generates the adjustment signal according to the sensing current signal and the sensing luminance signal. The first controller or the second controller generates the control command according to the adjustment signal, and a computing speed of the second controller is greater than a computing speed of the first controller.

To achieve one, part, or all of the objectives aforementioned or other objectives, a method for controlling light beam luminance provided by an embodiment of the invention includes: generating a driving current according to a control command by a driver; generating an output light beam according to the driving current an illuminating device; detecting the driving current and the output light beam by a sensing device, so as to respectively generate a sensing current signal and a sensing luminance signal; generating the control command according to the adjustment signal by a first controller or a second controller; and generating the adjustment signal according to the sensing current signal and the sensing luminance signal by a second controller. A computing speed of the second controller is greater than a computing speed of the first controller.

To sum up, the embodiments of the invention provide the second controller with the relatively high computing speed, when being operated with a multi-loop feedback circuit schematic, the adjustment signal may be calculated according to the dynamically measured sensing current signal and sensing luminance signal. The driving current provided by the driver is controlled by the adjustment signal, so as to regulate the luminance of the output light beam generated by the illuminating device.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
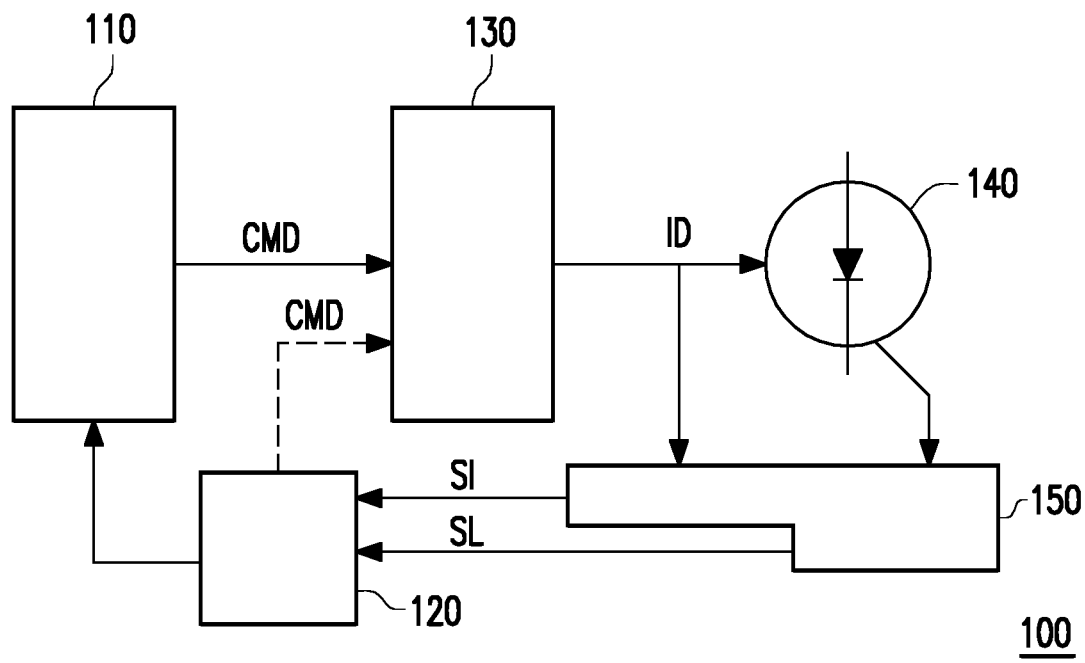
FIG. 1 is a schematic diagram of a light beam generating device according to an embodiment of the invention.

Referring to FIG. 1, FIG. 1 is a schematic diagram of a light beam generating device according to an embodiment of the invention. A light beam generating device 100 includes a first controller 110, a second controller 120, a driver 130, an illuminating device 140 and a sensing device 150. The second controller 120 is coupled to the first controller 110. The driver 130 is coupled to the first controller 110 or the second controller 120, and configured to receive a control command CMD and generate a driving current ID according to the control command CMD. The illuminating device 140 is coupled to the driver 130. The illuminating device 140 receives the driving current ID and generates an output light beam according to the driving current ID. The sensing device 150 is coupled to the second controller 120, the driver 130 and the illuminating device 140, configured to detect/sense the driving current ID transmitted by the driver 130 to generate a sensing current signal SI, and configured to detect/sense the output light beam generated by the illuminating device 140 to generate a sensing luminance signal SL. The sensing device 150 transmits the generated sensing current signal SI and sensing luminance signal SL to the second controller 120. The second controller 120 generates an adjustment signal according to the sensing current signal SI and the sensing luminance signal SL. In the embodiment, the second controller 120 may transmit the generated adjustment signal to the first controller 110, and the first controller 110 may generate the control command CMD according to the adjustment signal and transmit the control command CMD to the driver 130. In another embodiment, the second controller 120 may generate the control command CMD directly according to the control command CMD to directly transmit the control command CMD to the driver 130.

In the embodiment, the second controller 120 has a computing speed which is relatively higher than the first controller 110. For instance, the first controller 110 may be implemented by applying a micro-controller unit (MCU) known to people skilled in the art, and the second controller 120 may be implemented as a hardware circuit by applying a field programmable gate array (FPGA), a complex programmable logic device (CPLD) or an application-specific integrated circuit (ASIC). By the configuration of the embodiment, the second controller 120 may immediately respond to dynamical changes in the sensing current signal SI and the sensing luminance signal SL and immediately provide the corresponding control command CMD, thereby quickly adjusting the luminance of the output light beam.

In the embodiment, the second controller 120 may receive a target luminance signal, generate a luminance error signal according to the target luminance signal and the sensing luminance signal SL and generate a current command according to the luminance error signal. The second controller 120 may generate a current error signal according to the current command and the sensing current signal SI. The second controller 120 may generate the adjustment signal according to the current error signal. To describe in detail, the second controller 120 may first perform subtraction on two values of the target luminance and the sensing luminance signal SL to generate the luminance error signal and generate the current command according to the luminance error signal. Then, the second controller 120 may perform subtraction on two values of the current command and the sensing current signal SI to generate the current error signal. Thereafter, the second controller 120 may generate the adjustment signal according to the current error signal.

Based on the description set forth above, in the light beam generating device 100 of the embodiment, a closed inner loop may be formed by feeding back the sensing current signal SI, and a closed outer loop may be formed by feeding back the sensing luminance signal SL. With the dual-loop control mechanism, the luminance of the output light beam generated by the illuminating device 140 may be effectively controlled.

It is to be additionally mentioned that the illuminating device 140 of the embodiment may be constructed by laser diodes or light-emitted diodes (LEDs), which is not particularly limited.

Figure 2:
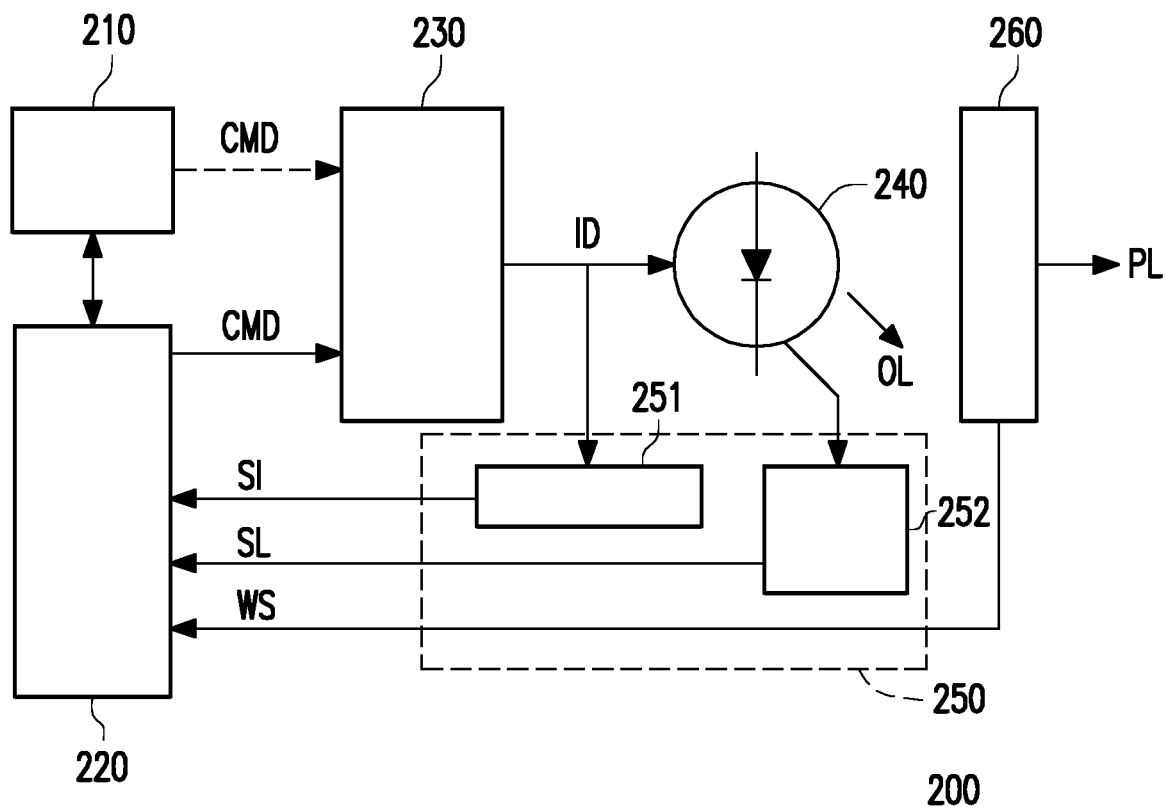
FIG. 2 is a schematic diagram of a light beam generating device according to another embodiment of the invention.

Referring to FIG. 2 hereinafter, FIG. 2 is a schematic diagram of a light beam generating device according to another embodiment of the invention. A light beam generating device 200 is applied in a projection system. The light beam generating device 200 includes a first controller 210, a second controller 220, a driver 230, an illuminating device 240, a sensing device 250 and an optical engine 260. The optical engine 260 is coupled to the illuminating device 240 and the sensing device 250. In the embodiment, the driver 230 receives a control command CMD transmitted by the first controller 210 or the second controller 220 and generates a driving current ID according to the control command CMD. The driving current ID is configured to drive the illuminating device 240 and drive the illuminating device 240 to generate an output light beam OL according to the driving current ID. On the other hand, the optical engine 260 receives the output light beam OL and generates an image light beam PL according to the output light beam OL.

In the embodiment, the sensing device 250 includes a current sensor 251 and a luminance sensor 252. The current sensor 251 is coupled to the driver 230 and the second controller 220 and detects the driving current ID to generate a sensing current signal SI. In an embodiment, the current sensor 251 may be a resistor and drives the driving current ID to flow through the resistor. In this way, the current sensor 251 may generate the sensing current signal SI according to a voltage difference between two terminals of the resistor. In another embodiment, the current sensor 251 may be a Hall Effect sensor, but the invention is not limited thereto. Hall Effect sensor may measure a wire flowing through the driving current ID, and thus the current sensor 251 may generate the sensing current signal SI according to the driving current ID.

On the other hand, the luminance sensor 252 is coupled to the illuminating device 240 and the second controller 220. The luminance sensor 252 detects the output light beam OL to generate the sensing luminance signal SL. In an embodiment, the luminance sensor 252 may be a photoelectric conversion component, for example, an optical coupling component or a photo diode, but the invention is not limited thereto.

In the embodiment, the optical engine 260 includes an optical wheel (not shown) configured to optically convert the output light beam OL. The sensing device 250 detects a rotary speed of the optical wheel to obtain rotary speed information WS. Meanwhile, the second controller 220 may generate an adjustment signal according to the rotary speed information WS, the sensing current signal SI and the sensing luminance signal SL.

To describe in detail, there may be a plurality of different partitions on the optical wheel, and each of the partitions may correspond to light beams with different wavelengths. The second controller 220 may determine a position status of the optical wheel according to the rotary speed information WS and determine a wavelength of a light beam currently generated by the optical wheel according to the position status of the optical wheel. In this way, the second controller 220 may select a target luminance corresponding to the light beam having the aforementioned wavelength and generate the corresponding adjustment signal according to the sensing current signal SI and the sensing luminance signal SL. Implementation details related to the rotary speed information of the optical wheel will be described in the embodiments below.

Figure 3:
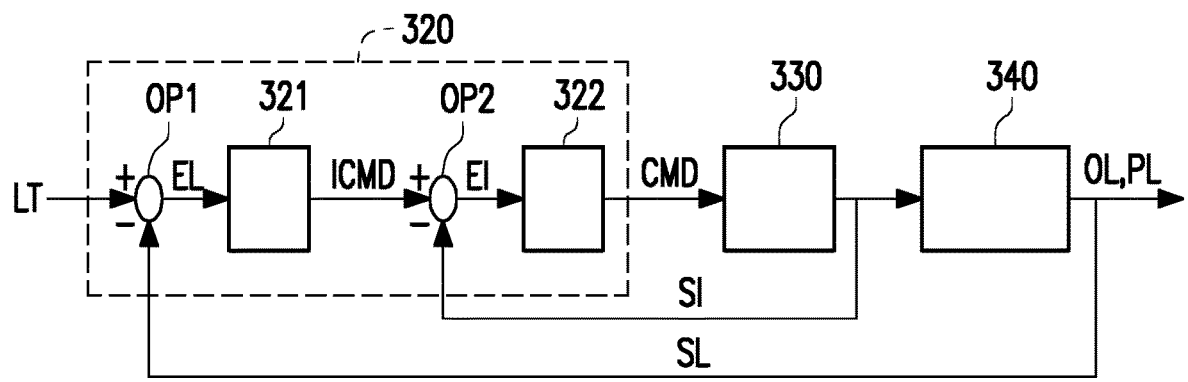
FIG. 3 is an equivalent circuit block diagram of a light beam generating device according to an embodiment of the invention.

Referring to FIG. 3, FIG. 3 is an equivalent circuit block diagram of a light beam generating device according to an embodiment of the invention. A light beam generating device 300 includes a second controller 320, a driver 330, an illuminating device and an optical engine 340. The second controller 320 includes operators OP1, OP2 and control circuits 321, 322. The control circuit 321 is coupled to the operator OP1, the operator OP2 is coupled to the control circuit 321, and the control circuit 322 is coupled to the operator OP2. The operator OP1 receives a target luminance signal LT and a sensing luminance signal SL and performs subtraction on two values of the target luminance signal LT and the sensing luminance signal SL to generate a luminance error signal EL. The control circuit 321 receives the luminance error signal EL and generates a current command ICMD according to the luminance error signal EL. The operator OP2 receives the current command ICMD and the sensing current signal SI and performs subtraction on two values of the current command ICMD and the sensing current signal SI (e.g., by subtracting two values of the sensing current signal SI from the current command ICMD) to generate a current error signal EI. The control circuit 322 receives the current error signal EI and generates a control command CMD according to the current error signal EI. In the embodiment, the control command CMD is, for example, a pulse width modulation (PWM) or an analog signal. The driver 330 generates the driving current according to the control command CMD and drives the illuminating device and the optical engine 340 to generate an output light beam OL and an image light beam PL.

In the embodiment, the control circuits 321 and 322 may be proportional controllers (P controllers), proportional integral controllers (PI controllers), proportional integral derivative controllers (PID controllers), fuzzy controllers, robust controllers, adaptive controllers, neural network (NN) controllers or other types of control circuits well known to people skilled in the art. Alternatively, in some embodiments, the control circuits 321 and 322 may also be implemented by means of looking up in a data table. The implementation manner of the control circuits 321 and 322 may be designed based on an actual status of the light beam generating device 300 and a requirement, which is not particularly limited in the invention.

Figure 4:
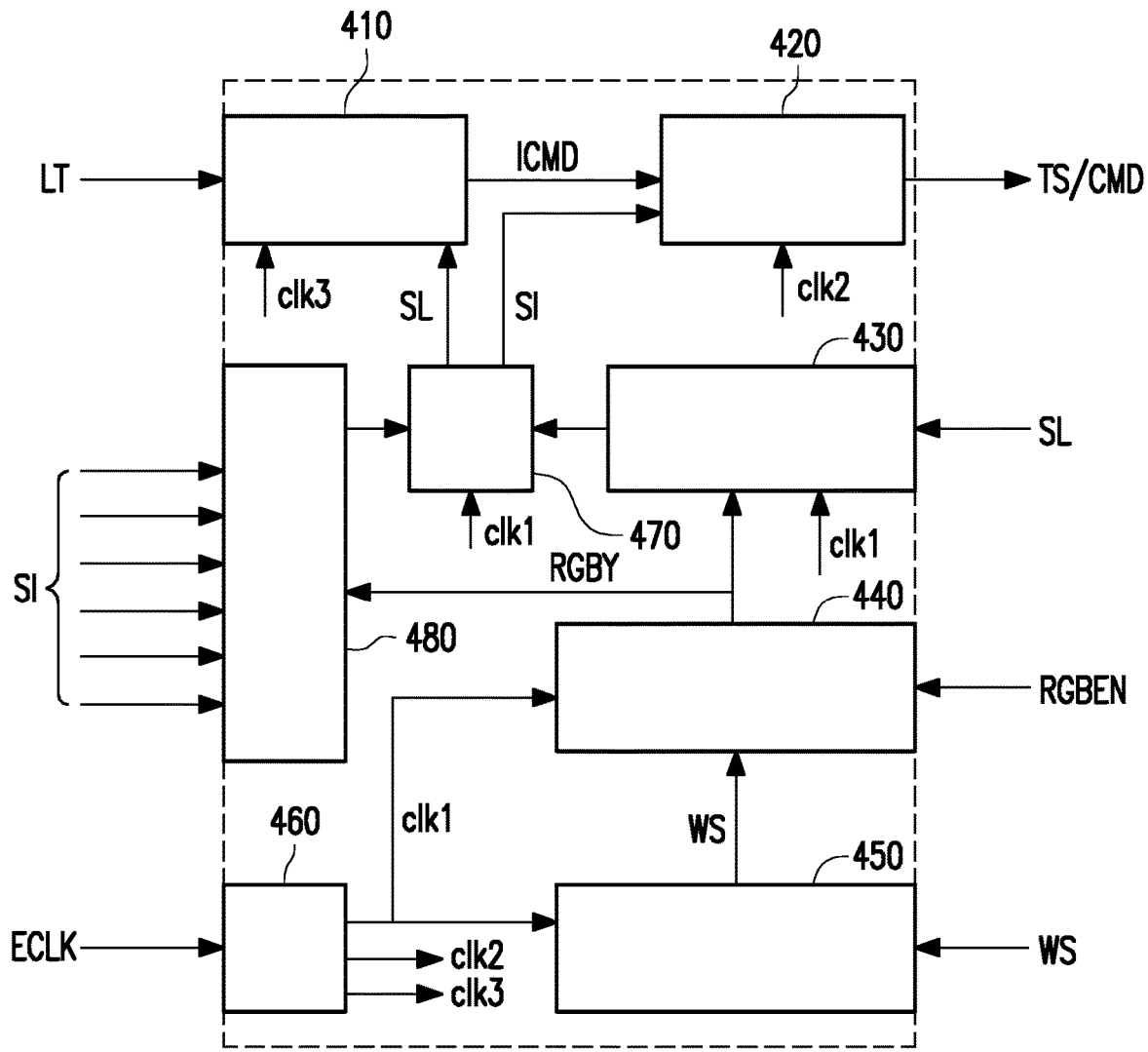
FIG. 4 is a schematic diagram of an implementation manner of a second controller according to an embodiment of the invention.

Referring to FIG. 4, FIG. 4 is a schematic diagram of an implementation manner of a second controller according to an embodiment of the invention. A second controller 400 includes a luminance control circuit 410, a current control circuit 420, a sensing luminance receiving interface 430, a position detector 440, a rotary speed receiving (rotary speed detector) interface 450, a phase locked loop (PLL) circuit 460, a storage device 470 and a signal format converter 480. The storage device 470 is coupled to the current control circuit 420 and the luminance control circuit 410. In the embodiment, the storage device 470 is, for example, a random access memory (RAM), and the signal format converter 480 is, for example, an analogue-to-digital converter (ADC), but the invention is not limited thereto. In the embodiment, the PLL circuit 460 receives an external clock signal ECLK and generates clock signals clk1-clk3 according to the external clock signal ECLK. In the embodiment, the PLL circuit 460 provides the clock signals clk1-clk3 respectively to the position detector 440, the current control circuit 420 and the luminance control circuit 410 to serve as working clocks. In the embodiment, a frequency of the clock signal clk1 is greater than a frequency of the clock signal clk2, and the frequency of the clock signal clk2 is greater than a frequency of the clock signal clk3.

The luminance control circuit 410 receives the clock signal clk3 to serve it as the working clock, the luminance control circuit 410 receives a target luminance signal LT and a sensing luminance signal SL corresponding to a position status of the optical wheel and generates a current command ICMD according to the target luminance signal LT and the sensing luminance signal SL. The current control circuit 420 generates an adjustment signal TS according to the current command ICMD and the sensing current signal SI. In other embodiments, the adjustment signal TS may be equivalent to the control command CMD.

The sensing luminance receiving interface 430 and the rotary speed receiving interface 450 are respectively configured to receive the sensing luminance signal SL and rotary speed information WS. The sensing luminance receiving interface 430 is coupled to the storage device 470 and stores the obtained sensing luminance signal SL in the storage device 470. In the embodiment, the sensing luminance receiving interface 430 and the storage device 470 receive the clock signal clk1 to serve it as the working clock. The rotary speed receiving interface 450 is coupled to the position detector 440. The rotary speed receiving interface 450 transmits the rotary speed information WS to the position detector 440, the position detector 440 may calculate a position status RGBY of the optical wheel according to the rotary speed information WS after receiving the rotary speed information WS. In the embodiment, the position status RGBY is, for example, related to a rotary angle of the optical wheel. Specifically, in the embodiment, the position detector 440 is coupled to the signal format converter 480 and performs an analog-to-digital operation on the position status RGBY to generate the position status RGBY in a digital format. In the embodiment, the signal format converter 480 may store the position status RGBY in the digital format in the storage device 470. In the embodiment, the rotary speed receiving interface 450 and the position detector 440 receive the clock signal clk1 to serve it as the working clock.

Figure 5:
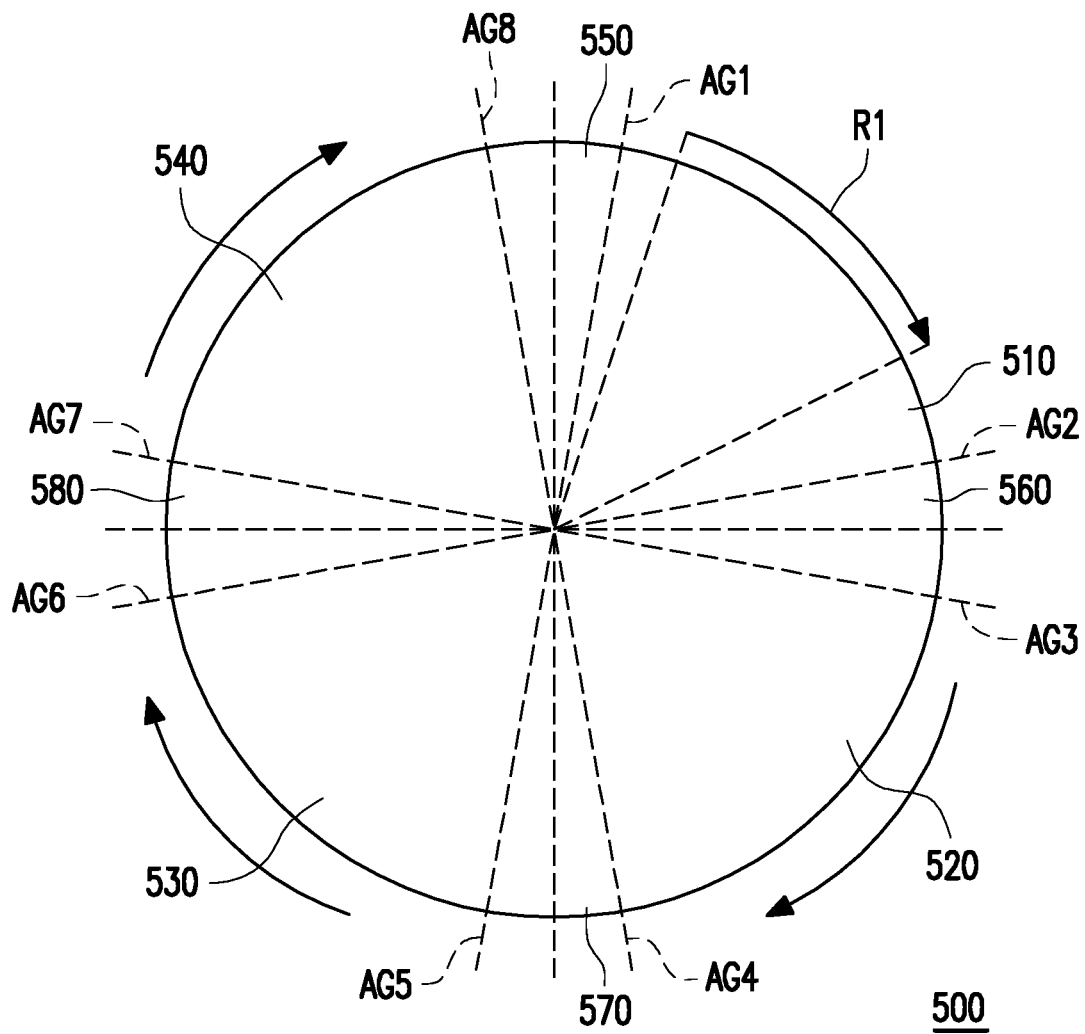
FIG. 5 is a schematic diagram of an implementation manner of an optical wheel according to an embodiment of the invention.

It is to be additionally mentioned that the position detector 440 further receives a signal RGBEN, wherein the signal RGBEN may be used to indicate a wavelength of the light beam generated by the optical wheel. Referring to FIG. 5, FIG. 5 is a schematic diagram of an implementation manner of an optical wheel according to an embodiment of the invention. An optical wheel 500 may include a plurality of valid partitions 510-540 and a plurality of invalid partitions 550-580. In the embodiment, the valid partitions 510-540 and the invalid partitions 550-580 are respectively staggered without overlapping with each other. Specifically, the valid partition 510 is configured between angles AG1-AG2, the invalid partition 560 is configured between angles AG2-AG3, the valid partition 520 is configured between angles AG3-AG4, the invalid partition 570 is configured between angles AG4-AG5, the valid partition 530 is configured between angles AG5-AG6, the invalid partition 580 is configured between angles AG6-AG7, the valid partition 540 is configured between angles AG7-AG8, and the invalid partition 550 is configured between angles AG8-AG1.

Regarding a position status RGBY calculated according to rotary speed information WS, in the embodiment, the rotary speed information WS is, for example, a signal having a plurality of pulse waves. In the embodiment, during a fixed time period, a frequency for the pulse waves generated by the rotary speed information WS is proportional to a rotary speed of the optical wheel. Taking the optical wheel rotating once and the rotary speed information WS having N pulse waves for example, whenever a pulse wave is generated by the rotary speed information WS, it may represent that the optical wheel rotates 360/N degrees. Thus, by calculating the number of the pulse waves of the rotary speed information WS, the rotary angle (i.e., the position status RGBY) of the optical wheel may be obtained.

In the embodiment, each of the valid partitions 510-540 on the optical wheel 500 may receive an output light beam generated by an illuminating device and correspondingly generate light beams having different wavelengths. When each of the invalid partitions 550-580 on the optical wheel receives the output light beam generated by the illuminating device, the optical wheel 500 does not generate any light beam. In this case, the signal RGBEN is incapable of indicating whether the output light beam is emitted to any one of the invalid partitions 550-580, and thus, the position detector 440 may further calculate the position status RGBY of the optical wheel 500 receiving the light beam more accurately according to the rotary speed information WS corresponding to a time axis. Taking the valid partitions 510-550 respectively corresponding to a red, a green, a blue and a yellow light beams for example, when the position status RGBY indicates that a region R1 of the optical wheel 500 receives the light beam, it may be learned that the light beam emitted by the optical wheel 500 is the red light beam.

It is to be additionally mentioned that the luminance control circuit 410, the current control circuit 420 and the position detector 440 may be constructed by digital circuits, and the sensing luminance receiving interface 430 and the rotary speed receiving interface 450 may be signal receiving interfaces of any form. The signal format converter 480 may be an analog-to-digital conversion (ADC) circuit well known to the people skilled in the art. The signal format converter 480 further receives the sensing current signal SI to convert the sensing current signal SI into a digital format and stores the sensing current signal SI in the digital format in the storage device 470. In addition, the storage device 470 may be a memory of any form, which is not particularly limited in the invention.

Figure 6:
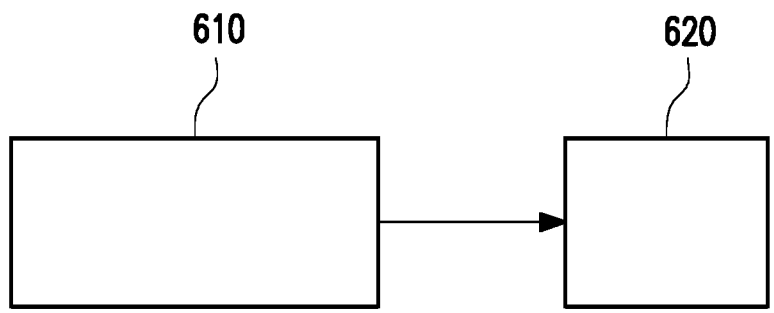
FIG. 6 is a schematic diagram of a projection system according to an embodiment of the invention.

Referring to FIG. 6, FIG. 6 is a schematic diagram of a projection system according to an embodiment of the invention. A projection system 600 includes a light beam generating device 610 and a lens 620. The light beam generating device 610 is configured to provide an image light beam to the lens 620, such that the lens 620 may generate a projection image. The light beam generating device 610 may be constructed based on the light beam generating devices 100, 200 and 300. The implementation details related to the light beam generating devices 100, 200 and 300 have been described in the embodiments above and will not be repeated.

Figure 7:
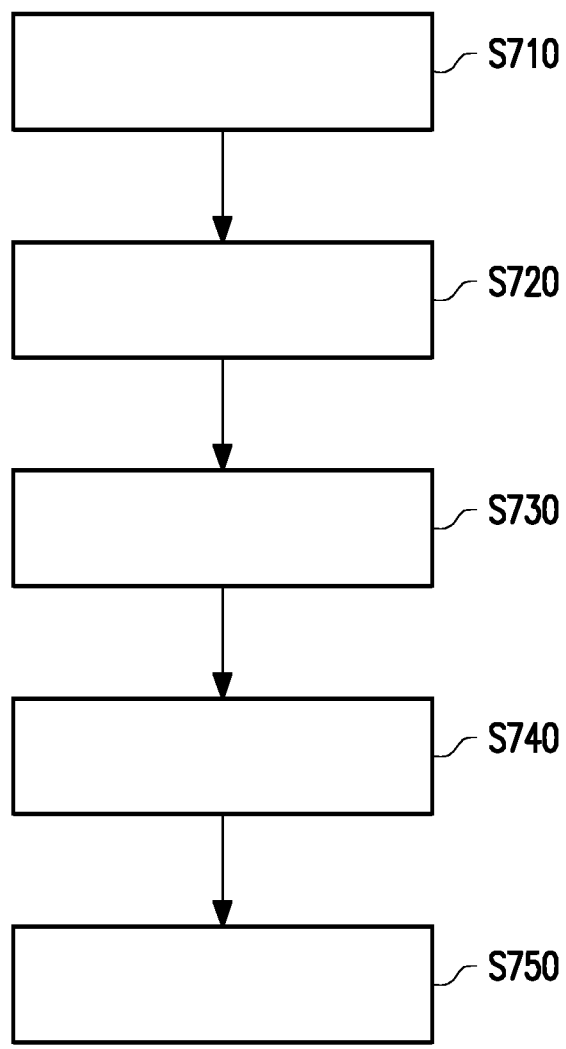
FIG. 7 is a flowchart of a method for controlling light beam luminance according to an embodiment of the invention.

Referring to FIG. 7, FIG. 7 is a flowchart of a method for controlling light beam luminance according to an embodiment of the invention. In FIG. 7, in step S710, a driver is provided to generate a driving current according to a control command. In step S720, an illuminating device is provided to generate an output light beam according to the driving current. In step S730, the driving current and the output light beam are detected, so as to respectively generate a sensing current signal and a sensing luminance signal. In step S740, a first controller or a second controller is provided to generate the control command according to an adjustment signal. In step S750, a second controller is provided to generate the adjustment signal according to the sensing current signal and the sensing luminance signal. A computing speed of the second controller is greater than a computing speed of the first controller.

The implementation details related to the steps have been described in the embodiments above and will not be repeated.

Based on the above, in the embodiments of the invention, with the configuration of the second controller having the relatively high computing speed, the adjustment signal is generated according to the sensing current signal and the sensing luminance signal by the second controller. In this way, the light beam generating device provided by the embodiments of the invention may generate the corresponding adjustment signal in response to the dynamic changes in the luminance of the output light beam and the current size of the driving current and further adjust the luminance of the output light beam of the light beam generating device.

The foregoing description of the preferred embodiments of the invention has been for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light beam generating device, comprising:
    a first controller;
    a driver, coupled to the first controller and adapted to generate a driving current according to a control command;
    an illuminating device, coupled to the driver and adapted to generate an output light beam according to the driving current;
    a sensing device, coupled to the driver and the illuminating device and adapted to detect the driving current and the output light beam, so as to respectively generate a sensing current signal and a sensing luminance signal; and
    a second controller, coupled to the first controller, the sensing device and the driver and adapted to generate the adjustment signal according to the sensing current signal and the sensing luminance signal,
    wherein the first controller or the second controller is adapted to generate the control command according to the adjustment signal, and a computing speed of the second controller is greater than a computing speed of the first controller.

2. The light beam generating device according to claim 1, wherein the second controller is adapted to receive a target luminance signal, generate a luminance error signal according to the target luminance signal and the sensing luminance signal, generate a current command according to the luminance error signal, generate a current error signal according to the current command and the sensing current signal and generate the adjustment signal according to the current error signal.

3. The light beam generating device according to claim 2, wherein the second controller comprises:
    a first operator, adapted to perform subtraction on two values of the target luminance signal and the sensing luminance signal to generate the luminance error signal;
    a first control circuit, coupled to the first operator and adapted to generate the current command according to the luminance error signal;
    a second operator, coupled to the first control circuit and adapted to perform subtraction on two values of the current command and the sensing current signal to generate the current error signal; and
    a second control circuit, coupled to the second operator and adapted to generate the adjustment signal according to the current error signal.

4. The light beam generating device according to claim 1, further comprising:
    an optical engine, coupled to the illuminating device and the sensing device and adapted to generate an image light beam according to the output light beam,
    wherein the optical engine has an optical wheel, and the sensing device is adapted to detect rotary speed information of the optical wheel.

5. The light beam generating device according to claim 4, wherein the second controller is adapted to generate the adjustment signal according to the rotary speed information, the sensing current signal and the sensing luminance signal.

6. The light beam generating device according to claim 4, wherein the second controller comprises:
    a luminance control circuit, adapted to receive a target luminance signal corresponding to a position status of the optical wheel and the sensing luminance signal to generate the current command according to the target luminance signal and the sensing luminance signal;
    a current control circuit, adapted to generate the adjustment signal according to the current command and the sensing current signal; and
    a position detector, adapted to receive the rotary speed information and calculate the position status of the optical wheel according to the rotary speed information.

7. The light beam generating device according to claim 6, wherein the optical wheel comprises a plurality of valid partitions and a plurality of invalid partitions, and the valid partitions and the invalid partitions are respectively staggered without overlapping with each other.

8. The light beam generating device according to claim 6, wherein the second controller further comprises:
    a phase locked loop (PLL) circuit, adapted to receive an external clock signal and generate a first clock signal, a second clock signal and a third clock signal according to the external clock signal, wherein the PLL circuit provides the first clock signal to the third clock signal respectively to the position detector, the current control circuit and the luminance control circuit to serve as working clocks, a frequency of the first clock signal is greater than a frequency of the second clock signal, and the frequency of the second clock signal is greater than a frequency of the third clock signal.

9. The light beam generating device according to claim 6, wherein the second controller further comprises:
a storage device, coupled to the current control circuit and the luminance control circuit and adapted to store the sensing current signal and the sensing luminance signal.

10. The light beam generating device according to claim 1, wherein the sensing device comprises:
a current sensor, coupled to the second controller and the driver and adapted to generate the sensing current signal; and
a luminance sensor, coupled to the second controller and the illuminating device and adapted to generate the sensing luminance signal.

11. A projection system, comprising:
a lens; and
a light beam generating device, coupled to the lens comprising:
a first controller;
a driver, coupled to the first controller and adapted to generate a driving current according to a control command;
a illuminating device, coupled to the driver and adapted to generate an output light beam according to the driving current;
a sensing device, coupled to the driver and the illuminating device and adapted to detect the driving current and the output light beam, so as to respectively generate a sensing current signal and a sensing luminance signal; and
a second controller, coupled to the first controller, the sensing device and the driver and adapted to generate an adjustment signal according to the sensing current signal and the sensing luminance signal,
wherein the first controller or the second controller is adapted to generate the control command according to the adjustment signal, and a computing speed of the second controller is greater than a computing speed of the first controller.

12. The projection system according to claim 11, wherein the second controller is adapted to receive a target luminance signal, generate a luminance error signal according to the target luminance signal and the sensing luminance signal, generate a current command according to the luminance error signal, generate a current error signal according to the current command and the sensing current signal and generate the adjustment signal according to the current error signal.

13. The projection system according to claim 12, wherein the second controller comprises:
a first operator, adapted to perform subtraction on two values of the target luminance signal and the sensing luminance signal to generate the luminance error signal;
a first control circuit, coupled to the first operator and adapted to generate the current command according to the luminance error signal, a second operator, coupled to the first control circuit and adapted to generate the current error signal according to the current command and the sensing current signal; and
a second control circuit, coupled to the second operator and adapted to generate the adjustment signal according to the current error signal.

14. The projection system according to claim 11, wherein the light beam generating device further comprises:
an optical engine, coupled to the illuminating device and the sensing device and adapted to generate an image light beam according to the output light beam,
wherein the optical engine has an optical wheel, and the sensing device is adapted to detect rotary speed information of the optical wheel.

15. The projection system according to claim 14, wherein the second controller is adapted to generate the adjustment signal according to the rotary speed information, the sensing current signal and the sensing luminance signal.

16. The projection system according to claim 14, wherein the second controller comprises:
a luminance control circuit, adapted to receive a target luminance signal corresponding to a position status of the optical wheel and the sensing luminance signal and generate the current command according to the target luminance signal and the sensing luminance signal;
a current control circuit, adapted to generate the adjustment signal according to the current command and the sensing current signal; and
a position detector, adapted to receive the rotary speed information and calculating the position status of the optical wheel according to the rotary speed information.

17. The projection system according to claim 16, wherein the optical wheel comprises a plurality of valid partitions and a plurality of invalid partitions, and the valid partitions and the invalid partitions are respectively staggered without overlapping with each other.

18. The projection system according to claim 16, wherein the second controller further comprises:
a PLL circuit, adapted to receive an external clock signal and generate a first clock signal, a second clock signal and a third clock signal according to the external clock signal,
wherein the PLL circuit provides the first clock signal to the third clock signal respectively to the position detector, the current control circuit and the luminance control circuit to serve as working clocks, a frequency of the first clock signal is greater than a frequency of the second clock signal, and the frequency of the second clock signal is greater than a frequency of the third clock signal.

19. The projection system according to claim 16, wherein the second controller further comprises:
a storage device, coupled to the current control circuit and the luminance control circuit and adapted to store the sensing current signal and the sensing luminance signal.

20. The projection system according to claim 11, wherein the sensing device comprises:
a current sensor, coupled to the second controller and the driver and adapted to generate the sensing current signal; and
a luminance sensor, coupled to the second controller and the illuminating device and adapted to generate the sensing luminance signal.

21. A method for controlling light beam luminance, comprising:
- by a driver, generating a driving current according to a control command;
- by an illuminating device, generating an output light beam according to the driving current;
- by a sensing device, detecting the driving current and the output light beam, so as to respectively generate a sensing current signal and a sensing luminance signal;
- by a first controller or a second controller, generating the control command according to the adjustment signal; and
- by a second controller, generating the adjustment signal according to the sensing current signal and the sensing luminance signal,
- wherein a computing speed of the second controller is greater than a computing speed of the first controller.

* * * * *